United States Patent
Baney

(10) Patent No.: US 9,667,358 B2
(45) Date of Patent: *May 30, 2017

(54) IMPAIRMENT COMPENSATION

(75) Inventor: Douglas Baney, Santa Clara, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1249 days.

This patent is subject to a terminal disclaimer.

(21) Appl. No.: 13/170,346

(22) Filed: Jun. 28, 2011

(65) Prior Publication Data

US 2013/0003799 A1     Jan. 3, 2013

(51) Int. Cl.
*H04B 17/14* (2015.01)
*H04B 17/11* (2015.01)

(52) U.S. Cl.
CPC ............. *H04B 17/11* (2015.01); *H04B 17/14* (2015.01)

(58) Field of Classification Search
CPC ..................................................... H04B 17/14
See application file for complete search history.

(56) References Cited

U.S. PATENT DOCUMENTS

| | | | |
|---|---|---|---|
| 7,088,088 B1 | 8/2006 | Marzalek et al. | |
| 7,295,642 B2 * | 11/2007 | Xu ................................. | 375/373 |
| 7,295,961 B2 | 11/2007 | Root et al. | |
| 7,313,496 B2 | 12/2007 | Ishida et al. | |
| 7,340,218 B2 | 3/2008 | Shoulders et al. | |
| 7,423,470 B2 | 9/2008 | Gunyan et al. | |
| 7,671,605 B2 | 3/2010 | Gunyan et al. | |
| 7,777,497 B2 | 8/2010 | Albert-Lebrun et al. | |
| 7,801,505 B2 | 9/2010 | VanWiggeren et al. | |
| 7,924,026 B2 | 4/2011 | Horn et al. | |
| 7,940,056 B2 | 5/2011 | Maslen | |
| 8,319,502 B2 | 11/2012 | Hashimshony et al. | |
| 2003/0151736 A1 | 8/2003 | Achtenhagen et al. | |
| 2004/0232919 A1 | 11/2004 | Lacey | |
| 2005/0261880 A1 | 11/2005 | Gorin | |
| 2007/0002964 A1 * | 1/2007 | Xu ................................. | 375/271 |
| 2008/0212711 A1 | 9/2008 | Auranen et al. | |
| 2009/0322347 A1 * | 12/2009 | Hashimshony et al. ...... | 324/601 |
| 2010/0211348 A1 * | 8/2010 | Gray et al. .................... | 702/124 |

FOREIGN PATENT DOCUMENTS

GB     2414640     11/2005

OTHER PUBLICATIONS

Final Rejection dated Jun. 6, 2014 from U.S. Appl. No. 13/283,116.
Non-Final Office Action dated Dec. 6, 2013 for U.S. Appl. No. 13/283,116.

* cited by examiner

*Primary Examiner* — Andrew Schechter
*Assistant Examiner* — Daniel Kessie

(57) ABSTRACT

A method is provided for compensating for impairment of an electrical signal output from a device under test (DUT), the impairment resulting from an impairment network. The method includes measuring an impaired electrical signal received at an electronic analyzer via the impairment network; applying a coded pulse sequence to the impairment network; estimating an impairment transfer function corresponding to the impairment based on the applied pulse sequence; and correcting the measured electrical signal using the impairment transfer function to determine the electrical signal output from the DUT.

20 Claims, 4 Drawing Sheets

IMPAIRMENT COMPENSATION

BACKGROUND

Power meter leveling may be used to correct for frequency-dependent transmission losses caused by cable and connector impairment between an object of measurement or electromagnetic illumination, referred to as device under test (DUT), and the measurement instrumentation or the signal source. Power meter leveling correction, for electrical spectrum analyzers or signal generators usually involves coupling swept frequency power, over the frequency range of interest at the opposite side of the cable/connector impairment and feeding back an error signal that is used to calibrate the received power, or the sourced power as a function of operational frequency. However, the correction is scalar, and thus phase dispersive and mismatch effects that can distort time waveforms are not corrected, e.g., for an electronic signal analyzer (ESA) and/or for an electrical signal generator.

An alternative conventional approach to power meter leveling is to measure the impairment with a swept-frequency vector network analyzer and to determine correction data. The correction data is stored, and subsequently used to provide correction of phase and/or amplitude distortion. However, because this approach is non-insitu, it does not account for the time-varying nature of distortions caused by cable/connector impairment, nor does it provide a means to compensate time-varying distortions within the confines of the measurement instrumentation which may interact with the impairments between the measurement instrument and the DUT. Also, separate measurement equipment must be provided for the measurement, which is time consuming and inconvenient.

SUMMARY

In a representative embodiment, a method is provided for compensating for impairment of an electrical signal output from a device under test (DUT), the impairment resulting from an impairment network. The method includes measuring an impaired electrical signal received at an electronic analyzer via the impairment network; applying a coded pulse sequence to the impairment network; estimating an impairment transfer function corresponding to the impairment based on the applied pulse sequence; and correcting the measured electrical signal using the impairment transfer function to determine the electrical signal output from the DUT.

In another representative embodiment, a method is provided for compensating for impairment of an electrical signal output from a signal generator, the impairment resulting from an impairment network. The method includes determining an electrical signal to be provided to a DUT via the impairment network; applying a coded pulse sequence to the impairment network; estimating an impairment transfer function corresponding to the impairment based on the applied pulse sequence; and correcting the electrical signal using the impairment transfer function prior to the impairment network to provide the electrical signal to the DUT.

In another representative embodiment, a system for compensating for impairment of a test signal transmitted through an impairment network includes a pulse generator, a processing device and a correction circuit. The pulse generator is configured to apply a pulse sequence to the impairment network. The processing device is configured to measure the test signal after the test signal passes through the impairment network, to estimate an impairment transfer function of the impairment based on a corresponding response to the applied pulse sequence from the impairment network, and to determine impairment correction information based on the measured test signal and the estimated impairment transfer function. The correction circuit is configured to apply the impairment correction information received from the processing device to the test signal after the test signal passes through the impairment network to provide a corrected test signal.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
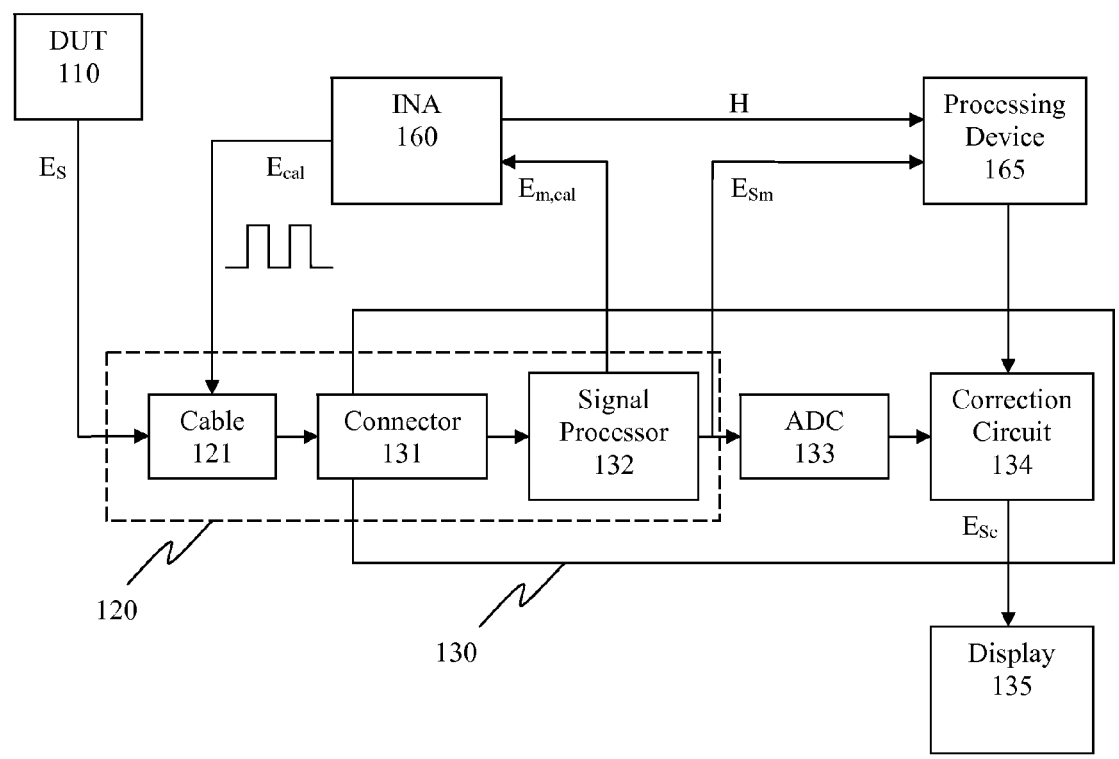
FIGS. 1A and 1B are functional block diagrams illustrating systems for compensating for signal impairment for a device under test (DUT), according to a representative embodiment.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that the drawings and the various elements depicted therein are not drawn to scale. Further, relative terms, such as "above," "below," "top," "bottom," "upper," "lower," "left," "right," "vertical" and "horizontal," are used to describe the various elements' relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as "above" another element, for example, would now be "below" that element. Likewise, if the device were rotated 90 degrees with respect to the view in the drawings, an element described as "vertical," for example, would now be "horizontal."

Various representative embodiments generally provide systems and methods for compensating for signal distortion caused by an impairment network, e.g., including at least cables and connectors of an instrumentation system configured for analyzing a device under test (DUT). The embodiments provide amplitude and phase correction information, so that proper waveforms may be generated, detected and received through calibration of measured complex dispersion. The process is insitu and therefore provides measurements and enables correction in near real-time. Also, a low-power spectral density approach may be incorporated to minimize interference with the environment, and with the measurement and/or the radiation source, and to enable gating of the broadband stimulus, as necessary to retain desired measurement goals. It also provides for $S_{11}$ measurement calibration that allows correction of mismatch effects between the DUT and measurement instrumentation and enables elimination of the impairment measurement coupler in certain situations, such as when reflection allows a viable $S_{11}$ model to be used to construct a transfer function, as discussed below.

FIG. 1A is a functional block diagram illustrating a system for compensating for signal impairment for a device under test (DUT), according to a representative embodiment, where the impairment affects an output signal provided by the DUT.

Referring to FIG. 1A, testing system 100A includes electronic analyzer 130 for testing DUT 110. The DUT 110 provides output signal $E_S$ to be measured. The output signal $E_S$ may be provided independently via internal signal sources, or via an antenna. Also, the signal $E_S$ may be provided in response to a stimulus signal from a signal generator (e.g., signal generator 150 in FIG. 1B), where the DUT 110 outputs output signal $E_S$ in response. The output signal $E_S$ is received by the electronic analyzer 130, e.g., in order to measure various characteristics of the output signal $E_S$ from the DUT 110. The electronic analyzer 130 may be a PXA series Signal Analyzer, available from Agilent Technologies, Inc., for example, although other devices may be incorporated without departing from the scope of the present teachings.

The testing system 100A further includes a pulse generator, such as illustrative impairment network analyzer (INA) 160, which is configured to generate a pulse sequence for calibration, indicated as calibration signal $E_{cal}$. In an embodiment, the INA 160 may incorporate functionality described, for example, in U.S. Pat. No. 7,801,505 to VanWiggeren et al., issued on Sep. 21, 2010, which is hereby incorporated by reference. The pulse sequence of the calibration signal $E_{cal}$ is used as a stimulus applied to an impairment network, such as representative impairment network 120, in order to determine corresponding impairment transfer functions, as discussed below. The pulse sequence may be coded as in a pseudorandom bit sequence (PRBS) or a prescribed binary sequence, for example. Alternatively, the pulse sequence may be a prescribed sequence of pulses having varying pulse widths and pulse amplitudes, and a prescribed associated frequency spectrum. For example, the pulse sequence may have variable amplitude, so that the impairment transfer function includes nonlinear characteristics of the impairment. As another example, the pulse pattern may be adjusted to tune the frequency spectrum, e.g., in order to optimize power spectrum components according to bandwidth needs and impairment loss variations versus frequency. In the case where the impairment resulted in a severe insertion loss around a specific frequency, the amplitude encoding of the components of the pulse frequency spectrum of the calibration may be increased at those frequencies to assure adequate calibration signal-to-noise ratio (SNR).

Referring to the electronic analyzer 130, the output signal $E_S$ from the DUT 110 passes through cable 121, as well as other test specific devices, such as amplifiers, filters, and the like (not shown), the impairment affects of which are assumed to be collectively included in the cable 121, for purposes of discussion. In the illustrative configuration, the electronic analyzer 130 includes connector 131, signal processor 132, analog-to-digital converter (ADC) 133 and correction circuit 134. The connector 131 may be an RF coaxial connector, for example, that connects to the cable 121 to the electronic analyzer 130. The signal processor 132 receives, processes (including setting of attenuation or gain and filtering), and in some cases mixes the output signal $E_S$ to provide an intermediate frequency (IF) signal. The signal output by the signal processor 132 is converted to a digital signal by the ADC 133. The correction circuit 134 receives impairment correction information from processing device 165, based on an impairment transfer function determined by measurements provided by the INA 160, as discussed below. The correction circuit 134 may be realized by hardware and/or by software executed within a processing device such as processing device 165 or a nonlocal processing device. The correction circuit 134 corrects the digital signal output by the ADC 133 to compensate for the impairment, and thus provides corrected output signal $E_{Sc}$. The corrected output signal $E_{Sc}$ may be stored in memory (not shown) and/or subjected to further processing. For example, the correction circuit 134 may be a display driver that controls output of the digital signal to display 135. The memory may be located in the electronic analyzer 130, or may be externally provided, and may include any number, type and combination of nonvolatile read only memory (ROM) and volatile random access memory (RAM), such as a disk drive, an electrically programmable read-only memory (EPROM), an electrically erasable and programmable read only memory (EEPROM), a CD, a DVD, a universal serial bus (USB) drive, Cloud resource, and the like.

The processing device 165 may be implemented in whole or in part by any of various processing devices, such as a processor, a central processing unit (CPU), application specific integrated circuits (ASICs), field-programmable gate arrays (FPGAs), Cloud resource, or combinations thereof, using software, firmware, hard-wired logic circuits, or combinations thereof. The processing device 165 may be located in the INA 160 or may be externally provided. When using a processor or CPU, a memory (not shown) is included with the processing device 165 for storing executable software/firmware and/or executable code that controls the impairment compensation process.

As mentioned above, impairment of the output signal $E_S$ is introduced by impairment network 120. In some cases, it is desirable to consider the impairment network 120 as constituting elements within the DUT 110, which may be the case where there is need to remove impairment elements within the DUT 110. Examples of impairment elements within the DUT 110 include connector elements, transmission lines and bond wires that make connection to the device within the DUT 110 that is subject to characterization interest. In these cases, the elements of the DUT 110 may be probed using a $S_{11}$ characterization or $S_{21}$ where the calibration signal $E_{cal}$ from INA 160 is passed into the DUT 110 with a coupling means provided by the DUT 110 that would execute a similar function as cable 121.

In the depicted example, the impairment network 120 includes the cable 121 connected between the DUT 110 and the electronic analyzer 130. The impairment network 120 may further include various internal components of the electronic analyzer 130 that drift with time, such as the connector 131 and the signal processor 132. Similarly, as described above, the impairment network further 120 may include various internal components of the DUT 110, although not show in FIG. 1A. The impairment network 120 distorts the output signal $E_S$ from the DUT 110 in amplitude and phase, and otherwise degrades the measurement of the output signal $E_S$ by the electronic analyzer 130. When the electronic analyzer 130 is implemented as an electronic spectrum analyzer, the degradation affects the power spectrum estimate. When the electronic analyzer 130 is implemented as a vector signal analyzer, the complex impairment affects any recovered constellations, as used in communications, where amplitude and phase distortions across frequency are important. The impairment network 120 may also create multi-path interference (MPI) problems through reflections. These impairments are generally time-dependent.

An active calibration system, including the INA 160 and the processing device 165, measures the impairment of the output signal $E_S$ to determine a resulting impairment transfer function, and uses the impairment transfer function to calibrate the estimate of the output signal $E_S$, the estimate being one of the electrical spectrum, the demodulated signal, or the time waveform associated with the output signal $E_S$. The calibration system may also use the impairment transfer function to provide correction, via post-processing, of sub-carrier distortions of modulated signals associated with the output signal $E_S$. In the depicted embodiment, the INA 160 applies a pulse sequence (calibration signal $E_{cal}$) to the impairment network 120 and measures the corresponding response (measured calibration signal $E_{m,cal}$) to determine the transfer function of the impairment, as discussed below, with reference to FIG. 2.

Figure 2:
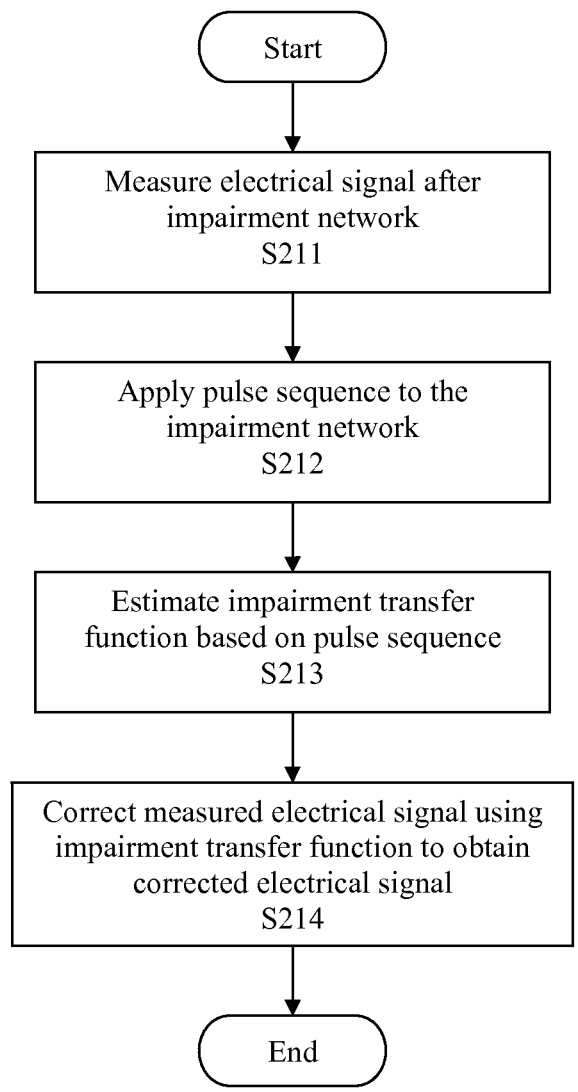
FIG. 2 is a flow diagram illustrating a method for compensating for impairment of an output signal received from a DUT, according to a representative embodiment.

FIG. 2 is a flow diagram illustrating a method for compensating for impairment of an output signal received from a DUT, according to a representative embodiment. Notably, the method of FIG. 2 measurements and corrections may be performed in near real-time, e.g., as the various characteristics of the DUT are being tested.

Referring to FIGS. 1A and 2, the output signal $E_S$ output by the DUT 110 is applied to the electronic analyzer 130 and measured after passing though the impairment network 120 to provide measured output signal $E_{Sm}$ in block S211. For example, the output signal $E_S$ may be measured by the electronic analyzer 130. The measured output signal $E_{Sm}$ includes the distortions introduced by the impairment network 120, and therefore is only an estimate of the output signal $E_S$ as output by the DUT 110.

In block S212, the INA 160 applies the pulse sequence of the calibration signal $E_{cal}$ to the input of impairment network 120, which may be accomplished through a microwave coupler, resistive bridge, Wilkinson combiner or other available means to combine electronic signals together. The coded pulse sequence may include a PRBS, a prescribed binary sequence, or a prescribed pulse sequence of varying pulse widths and pulse amplitudes, for example. In the depicted embodiment, the calibration signal $E_{cal}$ is applied after the output signal $E_S$ is applied (and measured), although alternatively, the calibration signal $E_{cal}$ may be applied simultaneously with or before the output signal $E_S$, without departing from the scope of the present teachings.

In an embodiment, the pulse sequence is gated. Therefore, when the electronic analyzer 130 is implemented by a spectrum analyzer, for example, the PRBS pulse sequence is controlled to be applied only during retrace period or non-acquisition time of the electronic analyzer 130. Notably, because the INA 160 output is coded as a pulse-based spread spectrum like source, it may run continuously in the background, allowing for averaging effects and be subtracted from measurements of signal spectra, or in time domain measurements, be averaged out, if the spread spectrum source is decorrelated with respect to the DUT signal being characterized (output signal $E_S$). That is, over time, the transitions of the PRBS pulse sequence calibration are not correlated to signal transitions, providing the pulse sequence and estimating the resultant impairment transfer function, with only a negligible effect on the measurements performed by the electronic analyzer 130. The INA 160 may also provide the pulse sequence in response to a specific calibration request.

In block S213, the INA 160 estimates transfer function $H(\omega,t)$ of the impairment network 120 based on the measured calibration signal $E_{m,cal}$ received from the impairment network 120 in response to the calibration signal $E_{cal}$. In various embodiments, the impairment transfer function $H(\omega,t)$ may be frequency-dependent or time-dependent, as discussed below. Meanwhile, the measured output signal $E_{Sm}$, which includes the impairment introduced by the impairment network 120, is converted to a digital signal by the ADC 133 and then adjusted by the correction circuit 134, under control of the processing device 165 in step S214. That is, the processing device 165 provides a correction signal based on the estimated impairment transfer function $H(\omega,t)$ determined in step S213 and the measured output signal $E_{Sm}$ determined in step S211, causing the correction circuit 134 to provide corrected (or calibrated) output signal $E_{Sc}$, which is substantially the same as a digital output signal $E_S$ as it would appear prior to the impairment network 120.

For linear impairments that do not depend on the output signal $E_S$, but vary in time due to environmental factors, time $t_o$ represents the point in time that the transfer function was characterized, ideally this time $t_o$ would be the same or close to the time of acquisition of the measured output signal $E_{Sm}$ relative to the rate of change of environmental or vibration effects perturbing the impairment network 120. In an embodiment, the corrected output signal $E_{Sc}$ is the ratio of the measured output signal $E_{Sm}$ and the frequency or time-dependent impairment transfer function H, or $E_{Sc}(t_o)=E_{Sm}(t_o)/H(t_o)$. Notably, for purposes of illustration, the frequency dependence is sometimes dropped; however, it is assumed that the measured signals will in general have frequency dependence.

As mentioned above, in an embodiment, the impairment transfer function H of the impairment network 120 is frequency dependent, indicated as impairment transfer function $H(\omega)$, where $\omega$ is the radian frequency equal to $2\pi f$, where frequency f spans the measurement frequency range of interest and where the power spectrum of the pulse sequence provides sufficient power at frequencies across the frequency range where calibration and correction is required, e.g. 10 MHz-10 GHz. Accordingly, the impairment transfer function $H(\omega)$ may be estimated using magnitude and phase analysis of the pulse sequence, denoted as calibration signal $E_{cal}$, provided by the INA 160 and the return pulse sequence, denoted as measured calibration signal $E_{m,cal}$, received by the INA 160 using S-parameter concepts. The transfer function $H(\omega)$ is obtained by the ratio of the frequency spectrum of the measured calibration signal $E_{m,cal}(\omega)$ to the frequency spectrum of the calibration signal $E_{cm}(\omega)$, such that $H(\omega)=E_{m,cal}(\omega)/E_{cal}(\omega)$, which is in general a complex result for the method described herein. The concept of a frequency spectrum associated with a signal is well-known to those skilled in the art.

As discussed above, the corrected output signal $E_{Sc}(\omega)$ is the ratio of the measured output signal $E_{Sm}(\omega)$ to the frequency-dependent impairment transfer function $H(\omega)$. For example, an estimated impairment transfer function $H'(\omega)$ may be inferred using S-parameter $S_{11}$ of the impairment network 120, which is determined based on the reflection of the pulse sequence at the input of the impairment network 120. As an example, for $S_{11}$ characterization, the calibration signal $E_{cal}$ is not provided to the coupler in cable 121, as is the case for $S_{21}$ characterization. Instead, the calibration signal $E_{cal}$ may feed into the same connection used to provide the measured calibration signal $E_{m,cal}$ from the signal processor 132, but in the opposite sense. That is, the calibration signal $E_{cal}$ moves from the INA 160 to the signal processor 132 and then through the connector 131 to the cable 121. Standard open, short and termination calibrations may be applied at the output of the cable 121 or within the DUT 110 in accordance with commonly-used methods for calibration of $S_{11}$ measurements.

Use of the S-parameter $S_{11}$ predicts the S-parameter $S_{21}$ based on reflections from probe energy, and thus requires the presence of back-scattered energy to be useful. Also, the impairment transfer function $H'(\omega)$ may be estimated from $S_{11}$ measurement only under certain conditions, such as simple reactive impairments. It would not be applicable, for example to unidirectional circuits such as typically encounter with amplifiers, isolators or similar, as would be apparent to one of ordinary skill in the art. Alternatively, the estimated impairment transfer function $H'(\omega)$ may be measured directly using one of S-parameter $S_{21}$ or $S_{12}$ of the impairment network 120, based on the voltage gain (or reverse voltage gain for reciprocal systems) of the pulse sequence through the impairment network 120. For example, $S_{21}=E_{Im}(\omega)/E_I(\omega)=H'(\omega)$, where $E_{Im}(\omega)$ is the measured spread spectrum frequency dependent signal from the signal processor 132 and $E_I(\omega)$ is the transmitted spread spectrum frequency dependent signal into the impairment networks 120 (e.g., at cable 121).

Generally, to determine the frequency-dependent impairment transfer function $H(\omega)$, the pulse sequence has a frequency content that allows appropriate sampling. The pulse sequence amplitude may stay fixed for linear calibrations where the response SNR provides adequate measurement certainty. Also, variations in time of the estimated impairment transfer function $H'(\omega)$ are considered to be slow-variations, at such a rate that calibrations are considered stable across the current measurement or at least correctable with models, such as polynomial fits, that allow interpolation or extrapolation of the time-varying calibration.

In alternative embodiments, the impairment of the impairment network 120 is time-dependent. These time-dependent impairments may be caused by additional modulating forces, such as rapid temperature changes in comparison to the calibration cycle, or bias voltage changes that result in a type of nonlinearity referred to herein as a modulation nonlinearity. An electrical mixer is an example of this class of nonlinearity as the system is usually linear with respect to the signal, but nonlinear in time due to the modulation applied to the system. Another type of nonlinearity, referred to herein as a functional nonlinearity, occurs when the output depends in a nonlinear fashion on the input signal resulting in nonlinear impairment. In the case of a component with modulation nonlinearity, the corrected output signal $E_S(t)$ is the ratio of the measured output signal $E_{Sm}(t)$ to the time-dependent impairment transfer function $H(t)$. Notably, the division operation described by the ratio is a nonlinear operation that corrects for the nonlinear impairment due to the modulation nonlinearity. In the case of functional nonlinearity, correction is more complex as an impairment inverse function would need to be determined and applied.

Square-law nonlinear effects, such as where the calibration signal $E_{cal}$ drives nonlinear effects in an electrical diode, would be a class of functional nonlinearity. As another example of functional nonlinearity, a component can exhibit trigonometric sine-type nonlinear distortion, such as is the case with Mach-Zehnder interferometer type frequency discriminators, where the discrimination constant varies sinusoidally with departure of the signal from the nominal quadrature state of the interferometer. The output depends on the trigonometric sine function of the input signal frequency excursion. With this functional nonlinearity, the impairment is typically corrected using the inverse function, or Arcsine function of the output.

For the case of modulation nonlinearity, if the calibration cycle is reduced in time compared to the fastest significant time variations of the modulation nonlinearity, then calibration is achieved using the methods described on linear impairments. Otherwise, the impairment transfer function $H(t)$ may be obtained through a search method or with the development of a model. The search method utilizes the degrees of freedom in complex frequency space, i.e., where amplitude and phase of Fourier spectral components are adjusted, or effectively, the shape of a waveform is adjusted, to replicate the output signal $E_S(t)$. In one approach, the INA 160 applies the calibration signal $E_{cal}$ to the impairment network 120, without the output signal $E_S(t)$ from the DUT 110 present. An output calibration signal $E_{cal}$ waveform is adjusted, via searching, such that the measured calibration signal $E_{m,cal}$ replicates the measured output signal $E_{Sm}(t)$ waveform, measured when the output signal $E_S(t)$ is present and the calibration signal $E_{cal}$ is not present. In particular, the variable shape calibration signal $E_{cal}$ may be generated by the INA 160, and the waveform measurements may be performed with a time domain instrument such as an oscilloscope used in the time domain to provide phase information and the frequency domain to evaluate the spectral content required in the calibration signal $E_{cal}$. Searching is required in this amplitude, phase and frequency space to obtain the replica of measured output signal $E_{Sm}(t)$ waveform.

The estimated impairment modulation nonlinearity function $H'(t)$ may be determined by dividing the measured calibration signal $E_{m,cal}(t)$ by the incident calibration signal $E_{cal}$. Alternatively, the calibration signal $E_{cal}$ may be combined with the output signal $E_S(t)$, so that the estimated impairment transfer function $H'(t)$ may be determined when the adjusted calibration signal $E_{cal}$ matches the negative of the output signal $E_S(t)$, or $E_{cal}=-E_S(t)$. This constitutes construction of a well-known virtual ground, under the condition where two time-varying waveforms cancel at the virtual ground created at their combination point at the cable 121, such that no signal is observed on the measuring instrument, however the original input signal is determined in accordance with the measurement objective.

Methods have been developed based on the so-called X-parameters, which may be used in conjunction with the pulse sequence approach to enable development of a nonlinear model. X-parameter concepts are described, for example, in U.S. Pat. No. 7,423,470, to Gunyan et al.; U.S. Pat. No. 7,088,088 to Marzalek, et al.; U.S. Pat. No. 7,340,218 to Shoulders et al.; U.S. Pat. No. 7,671,605 to Gunyan et al.; U.S. Pat. No. 7,295,961 to Root et al.; and U.S. Pat. No. 7,924,026 to Horn et al., which are hereby incorporated by reference, and may be applied toward creation of the nonlinear impairment model.

As mentioned above, impairment of the stimulus or input signal provided to the DUT may also be compensated for by determining the impairment transfer function of a corresponding impairment network. The stimulus signal may be provided by a signal generator with or without the capability to modulate the carrier signal, or an arbitrary waveform generator. For example, FIG. 1B is a functional block diagram illustrating a system for compensating for signal impairment for a DUT, according to a representative embodiment, where the impairment affects an input signal provided to the DUT.

Figure 1B:
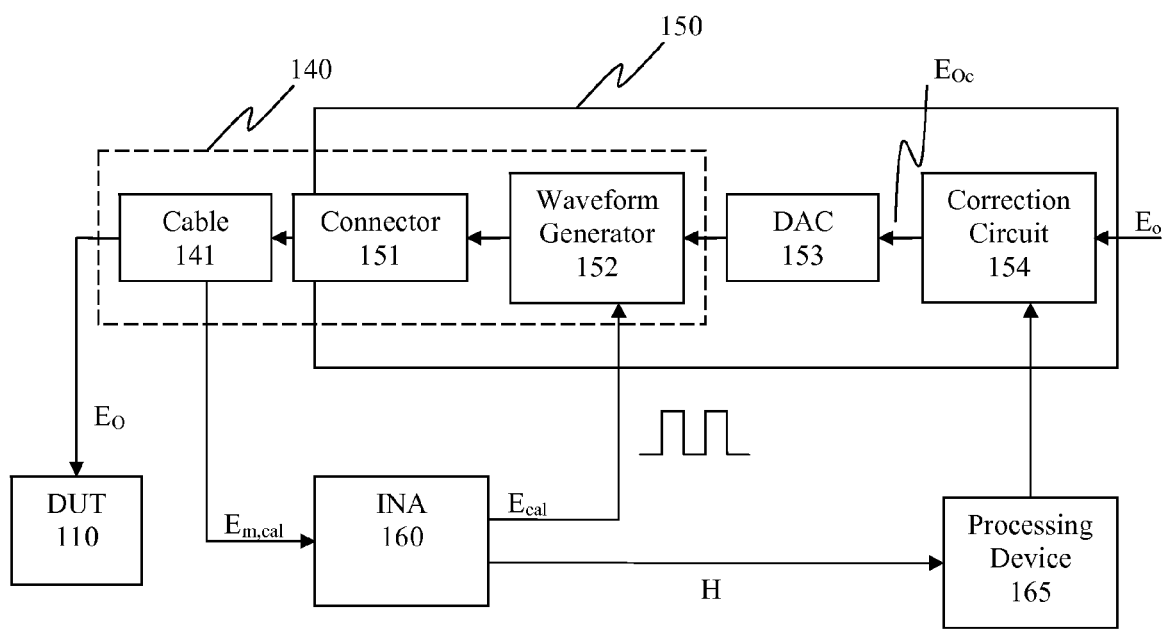

Referring to FIG. 1B, testing system 100B includes signal generator 150, which provides input signal $E_O$ to the DUT 110. In response, the DUT 110 outputs the output signal $E_S$ received by the electronic analyzer 130, as discussed above with reference to FIG. 1A. The signal generator 150 may be an MXG series Signal Generator, available from Agilent Technologies, Inc., for example, although other devices may be incorporated without departing form the scope of the present teachings. In various configurations, the signal generator 150 may be a separate device, or may be incorporated into a single device along with the electronic analyzer 130.

The signal generator 150 provides the input signal $E_O$ to the DUT 110 through cable 141. In the illustrative configuration, the signal generator 150 includes connector 151, waveform generator 152, digital-to-analog converter (DAC) 153 and correction circuit 154. The connector 151 may be an RF coaxial connector, for example, that connects to the cable 141 to the signal generator 150. The waveform generator 152 receives the input signal $E_O$ in accordance with user-specified parameters from the DAC 153.

Impairment of the input signal $E_O$ is introduced by impairment network 140. In the depicted example, the impairment network 140 includes the cable 141, as well as other test specific devices, such as amplifiers, filters, and the like (not shown), the impairment effects of which are assumed to be collectively included in the cable 141, for purposes of discussion. The impairment network 140 may further include various internal components of the signal generator 150, such as the connector 151 and the waveform generator 152. Similarly, the impairment network 140 may further include various internal components of the DUT 110 with coupling or splitting means to return measured calibration signal $E_{m,cal}$ from within DUT 110, although not show in FIG. 1B. The impairment network 140 distorts the input signal $E_O$ provided to the DUT 110 in amplitude and phase, for example.

The correction circuit 154 may be realized by hardware and/or software executed within a processing device, such as processing device 165, or other processing devices local or nonlocal to the instrument. The correction circuit 154 receives impairment correction information from the processing device 165, based on an impairment transfer function determined by measurements provided by INA 160, as discussed below. The correction circuit 154 thus receives and corrects the digital input signal provided to the DAC 153 to compensate for the impairment that will be subsequently introduced by the impairment network 140. This enables the DUT 110 to receive an input signal $E_o$ that is substantially the same as the desired signal to the DUT 110, even after the effects of the impairment network 140. The testing system 100B is depicted as having the same INA 160 and processing device 165 discussed above with reference to FIG. 1A. However, it is understood that the testing system 100B may have a separate INA and/or processing device, which are configured substantially the same as the INA 160 and the processing device 165, without departing from the scope of the present teachings.

Figure 3:
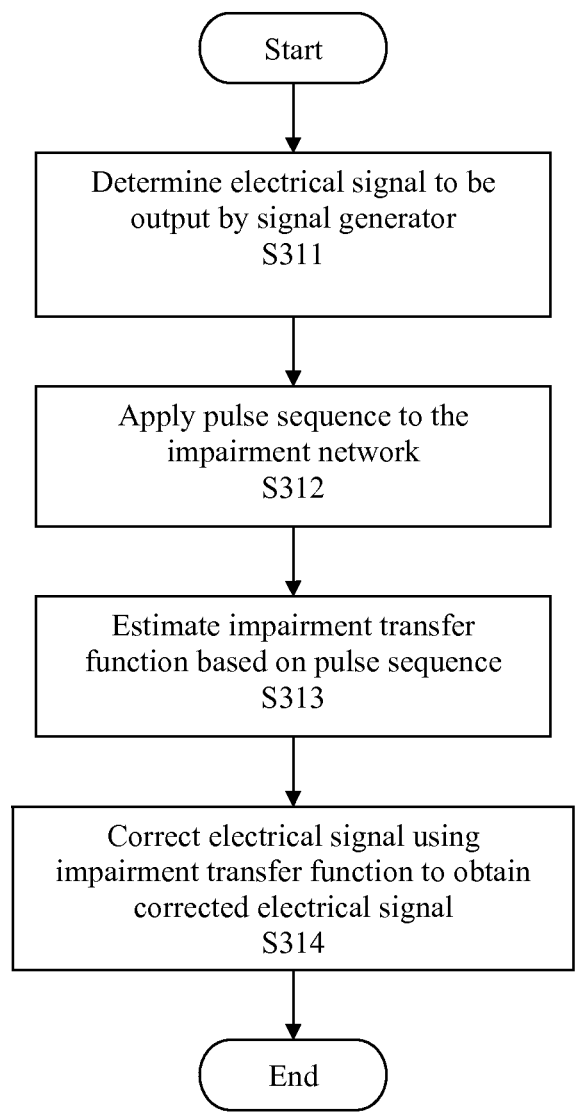
FIG. 3 is a flow diagram illustrating a method for compensating for impairment of an input signal provided to a DUT, according to a representative embodiment.

FIG. 3 is a flow diagram illustrating a method for compensating for the impairment of the input signal provided to a DUT, according to a representative embodiment. Notably, the method of FIG. 3 measurements and corrections may be performed in near real-time, e.g., as the various characteristics of the DUT are being tested.

Referring to FIGS. 1B and 3, the input signal $E_O$ to be provided by the signal generator 150 to the DUT 110 is determined in block S311. This may be a signal having user-determined parameters, for example, which is output by the DAC 153 to the waveform generator 132.

In block S312, the INA 160 applies a pulse sequence to the impairment network 140 for calibration, indicated as calibration signal $E_{cal}$. As discussed above, the pulse sequence may be encoded as a PRBS, a prescribed binary sequence, or a prescribed pulse sequence of varying pulse widths and pulse amplitudes, for example. Also as discussed above, the pulse sequence may be gated to provide calibration signals only during times prescribed by the measurement system. Likewise, in an embodiment, the INA 160 may run continuously in the background, or provide the pulse sequence in response to a specific calibration request.

In block S313, the INA 160 estimates transfer function $H(\omega,t)$ of the impairment network 140 to provide estimated impairment transfer function H' based on the measured calibration signal $E_{m,cal}$ received from the impairment network 140 in response to the calibration signal $E_{cal}$. In various embodiments, the impairment transfer function H may be frequency dependent and/or time dependent, as discussed above with regard to estimating the transfer function H of the impairment network 120. For example, frequency dependent impairment transfer function $H'(\omega)$ may be inferred using S-parameter $S_{11}$ of the impairment network 140, which is determined based on the reflection of the coded pulse sequence at the input of the impairment network 140. As an example, for $S_{11}$ characterization, similar to the discussion above with reference to FIG. 1A, the measured calibration signal $E_{m,cal}$ is no longer provided from the coupler in cable 141, as is the case for $S_{21}$ characterization. Instead, the measured calibration signal $E_{m,cal}$ may feed back from the output of cable 141, through connector 151, back through waveform generator 152 and to the INA 160, in the opposite sense, as the calibration signal $E_{cal}$. Alternatively, the frequency dependent estimated impairment transfer function $H'(\omega)$ may be measured directly using one of S-parameter $S_{21}$ or $S_{12}$ of the impairment network 140, based on the voltage gain (or reverse voltage gain) of the pulse sequence through the impairment network 140. Alternatively, time dependent estimated impairment transfer function H'(t) may be determined using an adjustable calibration signal $E_{cal}$, for example, as discussed above.

The input signal $E_O$ is corrected by the correction circuit 154 using the estimated impairment transfer function H' in step S314 to provide corrected (or calibrated) input signal $E_{Oc}$, which is input to the DAC 153. In an embodiment, the corrected complex frequency-domain representation of the input signal $E_{Oc}$ is the product of the desired input signal $E_O$ and the reciprocal of the estimated impairment transfer function H', or $E_{Oc}=(E_O)/(H')$. In the time-domain, the input signal $E_O$ is the inverse Fourier transform of the ratio of the corrected input signal $E_{Oc}$ and the estimated impairment transfer function H', or $FT^{-1}(E_O(\omega))=FT^{-1}(E_{Om}(\omega)/H'(\omega))$. The corrected input signal $E_{Oc}$ anticipates the impairment that will be introduced by the impairment network 140, so that the desired input signal $E_O$ is actually provided to the DUT 110, which is after the impairment network 140.

As discussed above, a computer processor, e.g., located in the INA 160 and/or the processing device 165, may be used to control various aspects of the disclosed embodiment, including measuring (input/output) electrical signals after they pass through the impairment network, estimating the impairment transfer function of the impairment based on an applied pulse sequence, and correcting the measured electrical signals using the impairment transfer function to determine the electrical signals before they pass through the impairment network. When using a processor, a memory or other computer readable medium, including any number, type and combination of nonvolatile ROM and volatile RAM, may be provided for storing executable software/firmware and/or executable code that allows it to perform the various functions.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of compensating for impairment of an electrical signal output from a device under test (DUT), the impairment resulting from an impairment network, the method comprising:
    measuring an impaired electrical signal received at an electronic analyzer via the impairment network;
    applying a coded pulse sequence to the impairment network, the coded pulse sequence comprising a plurality of pulses;
    estimating an impairment transfer function corresponding to the impairment based on the applied coded pulse sequence; and
    correcting the measured impaired electrical signal using the impairment transfer function to determine the electrical signal output from the DUT.

2. The method of claim 1, wherein the impairment network comprises a cable and at least one connector connecting the DUT and the electronic analyzer.

3. The method of claim 2, wherein the impairment network further comprises at least one internal component of the electronic analyzer that drifts with time or at least one internal component of the DUT.

4. The method of claim 1, wherein estimating the impairment transfer function comprises inferring the impairment transfer function using S-parameter $S_{11}$ of the impairment network.

5. The method of claim 1, wherein estimating the impairment transfer function comprises directly measuring the impairment transfer function using one of S-parameter $S_{21}$ or $S_{12}$ of the impairment network.

6. The method of claim 1, wherein estimating the impairment transfer function comprises:
    adjusting a calibration signal to match the electrical signal output from the DUT; and
    dividing the measured impaired electrical signal by the adjusted calibration signal.

7. The method of claim 1, wherein estimating the impairment transfer function comprises:
    adjusting a calibration signal to match a negative of the electrical signal output from the DUT; and
    mixing the adjusted calibration signal with the electrical signal output from the DUT.

8. The method of claim 1, wherein the applied coded pulse sequence has variable amplitude so that the impairment transfer function includes nonlinear characteristics of the impairment.

9. The method of claim 1, wherein the coded pulse sequence comprises one of a pseudorandom bit sequence (PRBS), a prescribed binary sequence, and a prescribed pulse sequence of varying pulse widths and pulse amplitudes.

10. The method of claim 1, wherein the coded pulse sequence is applied continuously in a background.

11. The method of claim 1, wherein the coded pulse sequence is applied only during a retrace period or a non-acquisition time of the electronic analyzer.

12. The method of claim 1, wherein correcting the measured electrical signal comprises:
    dividing an estimated response by the impairment transfer function to obtain corrected estimated response of the electrical signal.

13. The method of claim 1, further comprising:
    correcting a subcarrier distortion of a modulated signal, associated with the electrical signal output by the DUT, during post-processing using the impairment transfer function.

14. The method of claim 1, wherein the electronic analyzer is one of an electronic spectrum analyzer and an electronic signal analyzer.

15. A method of compensating for impairment of an electrical signal output from a signal generator, the impairment resulting from an impairment network, the method comprising:
    determining an electrical signal to be provided to a device under test (DUT) via the impairment network;
    applying a coded pulse sequence to the impairment network, the coded pulse sequence comprising a plurality of pulses;
    estimating an impairment transfer function corresponding to the impairment based on the applied coded pulse sequence; and
    correcting the electrical signal using the impairment transfer function prior to the impairment network to provide the electrical signal to the DUT.

16. The method of claim 15, wherein determining the impairment transfer function comprises determining at least one S-parameter of the impairment network.

17. The method of claim 15, wherein determining the impairment transfer function comprises adjusting a calibration signal to equal the electrical signal output from the signal generator.

18. A system for compensating for impairment of a test signal transmitted through an impairment network, the system comprising:
    a pulse generator configured to apply a coded pulse sequence to the impairment network, the coded pulse sequence comprising a plurality of pulses; and
    a processing device configured to measure the test signal after the test signal passes through the impairment network, to estimate an impairment transfer function of the impairment based on a corresponding response to the applied coded pulse sequence from the impairment network, and to determine impairment correction information based on the measured test signal and the estimated impairment transfer function; and
    a correction circuit configured to apply the impairment correction information received from the processing device to the test signal after the test signal passes through the impairment network to provide a corrected test signal.

19. The system of claim 18, wherein the coded pulse sequence applied by the pulse generator includes variable amplitude and variable pulse width.

20. The system of claim 18, further comprising:
an arbitrary waveform generator configured to generate a calibration signal,
wherein the processing device adjusts calibration signal to match the test signal, and estimates the impairment transfer function by dividing the measured test signal by the adjusted calibration signal.

* * * * *